United States Patent
Watanabe

(10) Patent No.: US 12,120,444 B2
(45) Date of Patent: Oct. 15, 2024

(54) IMAGE CAPTURING APPARATUS AND CONTROL METHOD THEREFOR

(71) Applicant: CANON KABUSHIKI KAISHA, Tokyo (JP)

(72) Inventor: Shinobu Watanabe, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 225 days.

(21) Appl. No.: 17/954,442

(22) Filed: Sep. 28, 2022

(65) Prior Publication Data
US 2023/0109210 A1 Apr. 6, 2023

(30) Foreign Application Priority Data
Oct. 4, 2021 (JP) .................... 2021-163430

(51) Int. Cl.
H04N 25/75 (2023.01)
H04N 25/42 (2023.01)

(52) U.S. Cl.
CPC .............. *H04N 25/75* (2023.01); *H04N 25/42* (2023.01)

(58) Field of Classification Search
None
See application file for complete search history.

(56) References Cited

U.S. PATENT DOCUMENTS 9,912,894 B2 3/2018 Hashimoto et al.

FOREIGN PATENT DOCUMENTS

JP 2013-009087 A 1/2013

*Primary Examiner* — Twyler L Haskins
*Assistant Examiner* — Surafel Yilmakassaye
(74) *Attorney, Agent, or Firm* — Cowan, Liebowitz & Latman, P.C.

(57) ABSTRACT

An image capturing element provided in an image capturing apparatus has an AD conversion circuit unit configured to perform AD conversion of a pixel signal by comparing the pixel signal, which is output from among a plurality of pixels, with a slope voltage for which the electric potential changes with time. A synchronous control unit selects a first mode or a second mode according to a drive mode related to the image capturing element. In the first mode, AD conversion of the pixel signal is performed by selecting one slope voltage from a plurality of slope voltages, then comparing the selected slope voltage with the pixel signal, and in a second mode, AD conversion of the pixel signal is performed by comparing a pre-determined slope voltage with the pixel signal.

14 Claims, 8 Drawing Sheets

IMAGE CAPTURING APPARATUS AND CONTROL METHOD THEREFOR

BACKGROUND OF THE INVENTION

Field of the Invention

The present invention relates to a technology for analog digital conversion processing in an image capturing apparatus.

Description of Related Art

Increases in the number of pixels, and the transition to high-speed imaging in the CMOS (complementary metal oxide semiconductor) image sensors with which image capturing apparatuses are provided are progressing, and there is a demand for methods that can more rapidly read out pixel signals. As a measure for the rapid read out of a pixel signal, there is a method that performs digital output by disposing an analog digital conversion (referred to below as "AD conversion") circuit unit in each column in an image capturing element. Below, AD conversion circuit units will be abbreviated as "ADCs".

Japanese Unexamined Patent Application, First Publication No. 2013-9087 discloses a configuration for a slope method that uses a comparator and a counter as a column AD conversion method. In the state in which an analog pixel signal has been input into one input terminal of one of the comparators, a slope voltage for which the inclination changes according to the time is input into the other input terminal as a reference signal. The output from the comparator is inverted at the time at which the size relation of the pixel signal and the reference signal inverts. The counter progresses the count along with the passage of time, and when the output from the comparator is inverted, the progression of the counter stops. The output from the counter from when the count was stopped shows the digital value for the analog pixel signal.

Furthermore, a more rapid read out is made possible by switching between a low bit resolution ADC and a high bit resolution ADC according to the signal output. It is sufficient if the large-amplitude signal has a resolution that is sufficient in order to maintain an S/N ratio (a signal-noise ratio). Therefore, low bit resolution AD conversion is performed by the selected circuits in the ADC selecting a slope voltage with a large inclination at the time of the AD conversion of a large-amplitude signal. In contrast, high bit resolution AD conversion is performed by selecting a slope voltage with a small inclination at the time of the AD conversion of a small-amplitude signal. That is, a dual slope method is used, and it is possible to shorten the AD conversion time for large-amplitude signals.

However, although a dual slope method is the superior method for increasing the speed, there are cases in which these increased speed results cannot be obtained due to the time that the AD conversion of the pixel signal takes, and the time that the transmission of the pixel signal that has been converted to a digital signal takes. For example, in the case in which the transmission of the pixel signal that has been AD converted takes a long time, the increased speed effects from using the dual slope method cannot be obtained.

In addition, during AD conversion in the dual slope method, there is a possibility that the difference in gradients that occurs when results that were converted at different resolutions are combined will become a problem. In relation to non-smooth connection, these are extremely more likely to occur when the AD conversion resolution is low.

SUMMARY OF THE INVENTION

The image capturing apparatus in the embodiments of the present invention is provided with a converter configured to convert a pixel signal into a digital signal by comparing the pixel signal, which is output from a plurality of pixels of an image capturing element, with a slope voltage for which the electric potential changes with time and a controller configured to control the converter using a plurality of modes that correspond to operational conditions for when the pixel signal is read out. In a first mode, the controller performs control of the conversion of the pixel signal that the converter performs by comparing a slope voltage selected from a plurality of slope voltages with the pixel signal, in a second mode, the controller performs control of the conversion of the pixel signal that the converter performs by comparing a slope voltage that has already been determined with the pixel signal, and the controller selects the first mode or the second mode by comparing a first time period from the read out of the pixel signal of the image capturing element until conversion by the converter with a second time period for transmission of the pixel signal that has been converted by the converter.

Further features of the present invention will become apparent from the following description of exemplary embodiments with reference to the attached drawings.

DETAILED DESCRIPTION OF THE INVENTION

Figure 1:
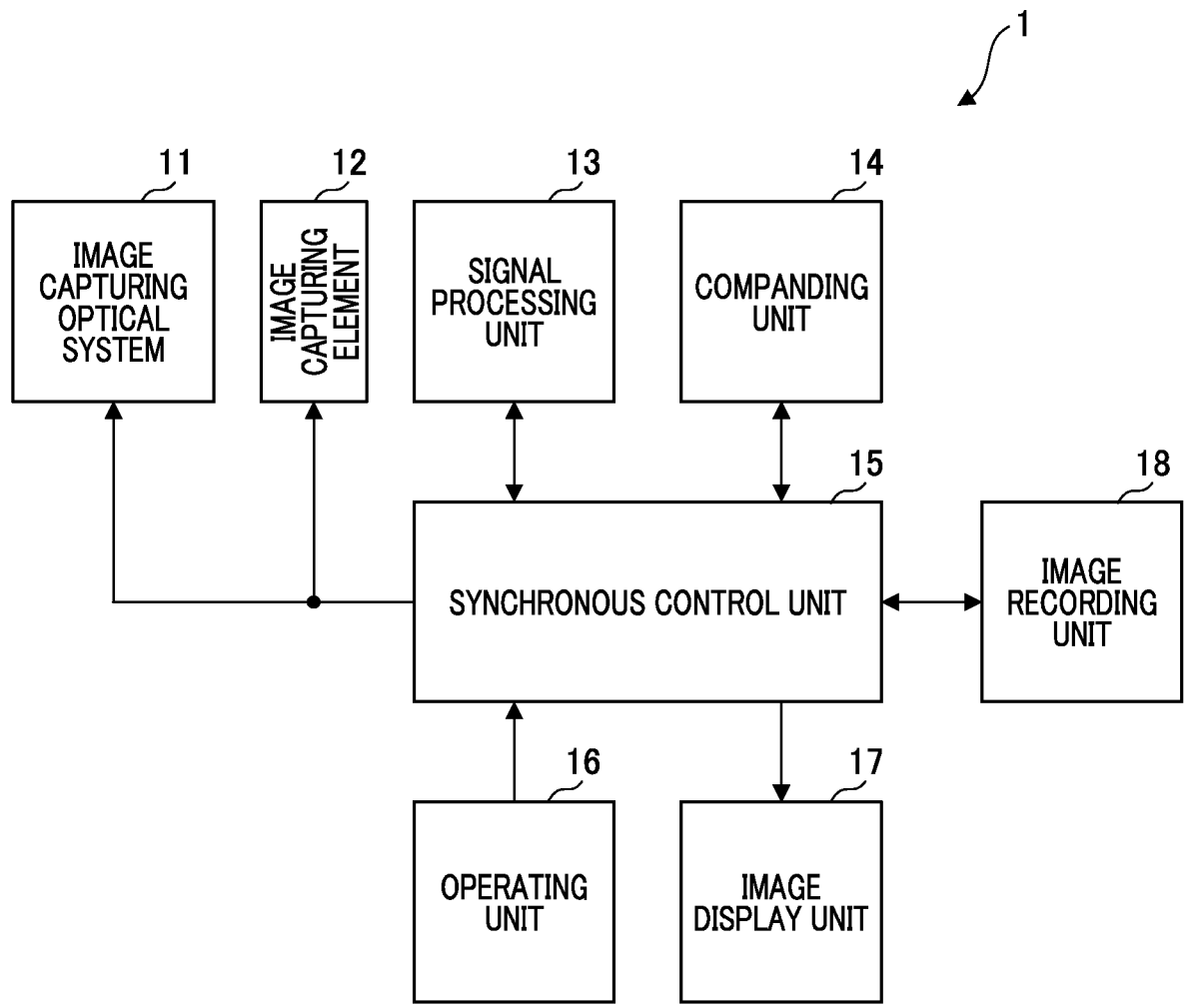
FIG. 1 is a block diagram showing a configuration of an image capturing apparatus according to the present embodiment.

Below, preferred embodiments of the present invention will be explained in detail based on the attached drawings. FIG. 1 is a block diagram showing a configuration of an image capturing apparatus according to the present invention. An image capturing apparatus 1 is a digital still camera, a digital video camera, or the like. The image capturing apparatus 1 is provided with an image capturing optical system 11, an image capturing element 12, a signal processing unit 13, a companding unit 14, a synchronous control unit 15, an operating unit 16, an image display unit 17, and an image recording unit 18.

The image capturing optical system 11 is provided with a lens, a lens driving mechanism, a mechanical shutter mechanism, an aperture mechanism, and the like. From among these, the movable units are driven based on a control signal from the synchronous control unit 15.

The image capturing element 12 is an XY address method CMOS image sensor, and implements image capturing operations using a control signal from the synchronous control unit 15. The image capturing element 12 outputs an image signal that has been digitalized by an internal AD conversion circuit unit to the signal processing unit 13. The configuration of the image capturing element 12 will be explained in detail below.

The signal processing unit 13 performs signal processing and acquisition of control information such as AF (autofocus), AE (auto exposure), and the like from the digitalized image signal that is input from the image capturing element 12 under the control of the synchronous control unit 15. The signal processing unit 13 outputs an image signal that has been signal processed, and the control information to the synchronous control unit 15.

The companding unit 14 operates under the control of the synchronous control unit 15, and aside from executing compression encoding processing for the image signal, also executes expansion decoding processing of the encoded data for still images. In addition, the companding unit 14 may also execute compression encoding/expansion decoding processing for video images.

The synchronous control unit 15 is a microcontroller that is configured by, for example, a CPU (central processing unit), ROM (read only memory), RAM (random access memory), and the like. The synchronous control unit 15 integrally controls each unit of the image capturing apparatus 1 by executing programs that have been stored on the ROM or the like.

The operating unit 16 is configured by each type of operating member such as a shutter release button, and the like. The operating unit 16 outputs an operation command signal to the synchronous control unit 15 according to an input operation by a user. The synchronous control unit 15 performs control of each unit according to the operation command signal.

The image display unit 17 has a display device such an LCD (liquid crystal display) or the like, and displays an image according to an image signal. The image recording unit 18 is provided with, for example, a portable storage medium, and records image data files that have been compression encoded on the storage medium.

Next, the basic operations of the image capturing apparatus 1 will be explained. Before the image capturing of a still image, image signals that have been output from the image capturing element 12 are supplied to the signal processing unit 13 in order. The signal processing unit 13 executes signal processing on the image signals from the image capturing element 12, and provides these to the image display unit 17 through the synchronous control unit 15 to serve as the signal of a camera-through image. The image display unit 17 displays the camera-through image, and it is possible for the user to perform angle of view adjustment and the like by looking at the display image. When the shutter release button that is included in the operating unit 16 is pressed, the image signal for one frame is imported from the image capturing element 12 to the signal processing unit 13 by the control of the synchronous control unit 15.

The signal processing unit 13 executes signal processing on the imported image signal for the one frame, and provides the post signal processing image signal to the companding unit 14. The companding unit 14 performs compression encoding for the input image signal. The encoded data that has been generated is provided to the image recording unit 18 through the synchronous control unit 15. The data file for the still image that has been captured is stored on the image recording unit 18.

In contrast, in the case in which a data file for a still image that has been recorded on the image recording unit 18 is played back, the synchronous control unit 15 performs processing for loading the selected data file from the image recording unit 18 according to an operation input from the user using the operating unit 16. The companding unit 14 executes expansion decoding on the data. The image signal that has been decoded is provided to the image display unit 17 via the synchronous control unit 15, and a playback display of the still image is performed.

In the case in which recording of a video image is performed, the companding unit 14 executes compression encoding processing on the image signals that have been sequentially processed by the signal processing unit 13. Recording processing is performed on the data for the encoded video image that has been generated by sequential transmission to the image recording unit 18. In addition, in the case in which a video image is played back, the companding unit 14 performs expansion decoding processing by reading out the data file for the video image from the image recording unit 18. The video image is displayed by providing the data that has been processed to the image display unit 17.

Figure 2:
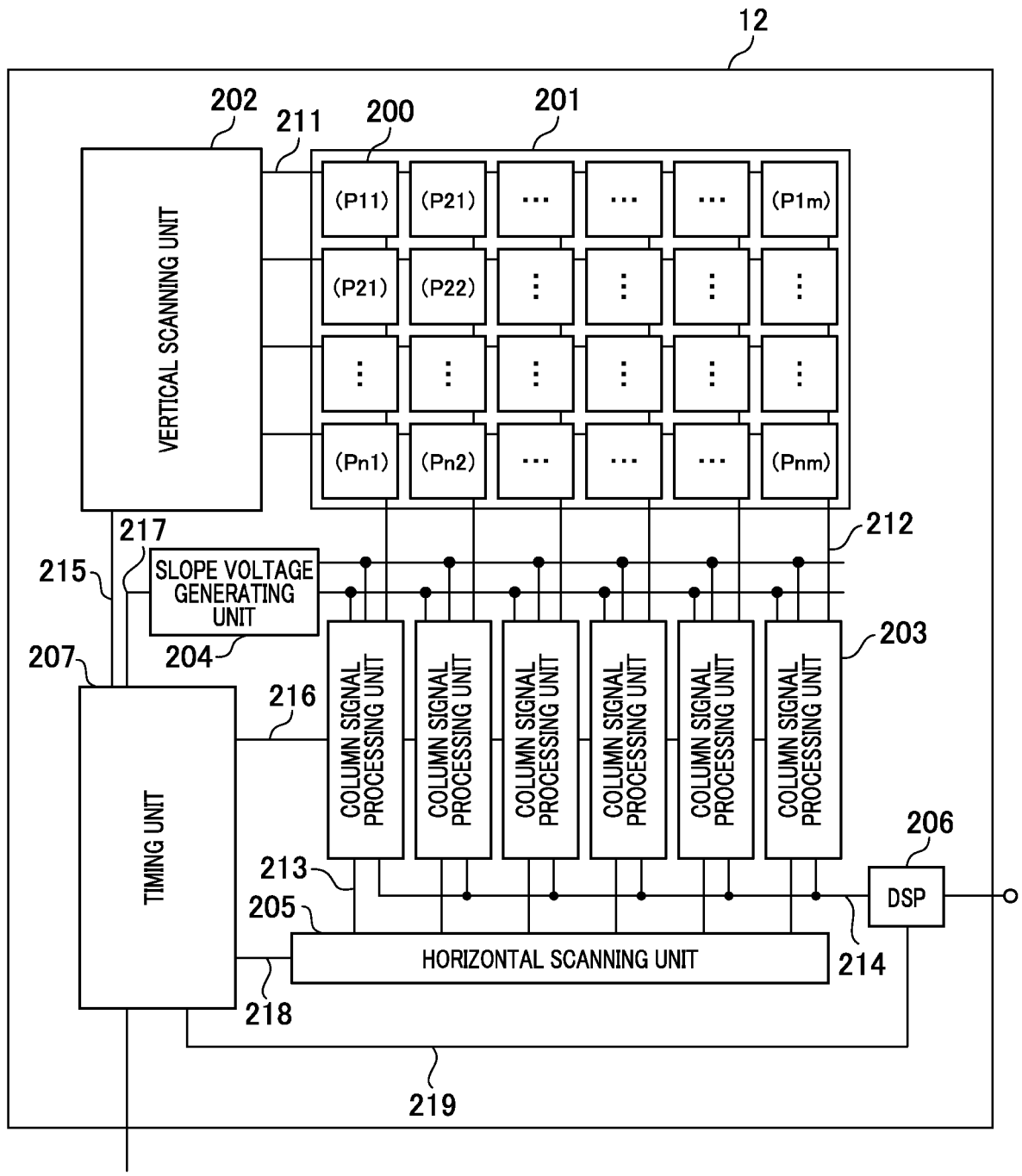
FIG. 2 is a block diagram showing a configuration of an image capturing element according to the present embodiment.

The configuration of the image capturing element 12 will be explained with reference to FIG. 2. FIG. 2 is a block diagram showing an outline of the configuration of the image capturing element 12. The image capturing element 12 is provided with a pixel region 201 comprising a plurality of pixels 200, a vertical scanning unit 202, a plurality of column signal processing units 203, a slope voltage generating unit 204, a horizontal scanning unit 205, a DSP 206, and a timing unit 207. DSP is an abbreviation of "digital signal processor". Below, an explanation is given assuming a pixel array in which the number of pixels is n×m.

The pixel region 201 is configured by the plurality of pixels 200, and each of the pixels 200 are arranged horizontally and vertically in a matrix form, as is shown by P11 to Pnm (n, and m are natural number variables). The first row of pixels is expressed as P11 to P1m, and the nth row of pixels is expressed as Pn1 to Pnm. In addition, it is assumed that a 2 by 2 array color filter in which R (red) filters and G (green) filters are repeated in the odd numbered rows, and G (green) filters and B (blue) filters are repeated in the even numbered rows, is arranged on the plurality of pixels 200.

The vertical scanning unit 202 selects pixel arrays from the pixel region 201 row by row, and performs a drive control for the reset operation and read out operation for the selected pixel row. A pixel control line 211 is mutually connected to each of the pixels in each pixel row, and a drive control signal with the unit of a row is transmitted by the vertical scanning unit 202. A vertical signal line 212 is mutually connected to each pixel in each pixel column. The pixel signal for the row that has been selected by the pixel control line 211 is read out by each of the corresponding vertical signal lines 212.

The slope voltage generating unit 204 generates a slope voltage that is used in the AD conversion that is performed by the plurality of column signal processing units 203. The slope voltage is a ramp waveform voltage in which the electric potential changes with time. That is, the slope voltage generating unit 204 generates a slope voltage in which the electric potential changes at a change rate that is fixed in relation to time, and it is possible to simultaneously generate slope voltages with different inclinations using a plurality of patterns. In addition, the slope voltage generating unit 204 generates a reference voltage VREF.

A plurality of column signal processing units 203 are provided for each corresponding vertical signal line 212, and the signal processing to be described below is performed on each of the signals for the pixels with the unit of a row that are sent via the vertical scanning line 212 based on the slope voltage.

The horizontal scanning unit 205 selects a column signal processing unit 203 for each column via each of the plurality of column selection lines 213, and transmits the stored pixel signals to the horizontal output line 214. The DSP 206 performs signal processing on the image signal that has been transmitted from the horizontal output line 214, and performs output to an external signal processing unit 13. The timing unit 207 outputs each type of clock signal, control signal, and the like that are necessary for the operations of each unit of the image capturing element 12 based on the control signal from the synchronous control unit 15. The control lines 215 to 219 are control lines that send the clock signal, the control signal, and the like from the timing unit 207 to each of the vertical scanning unit 202, the column signal processing unit 203, the slope voltage generating unit 204, the horizontal scanning unit 205, and the DSP 206.

Figure 3:
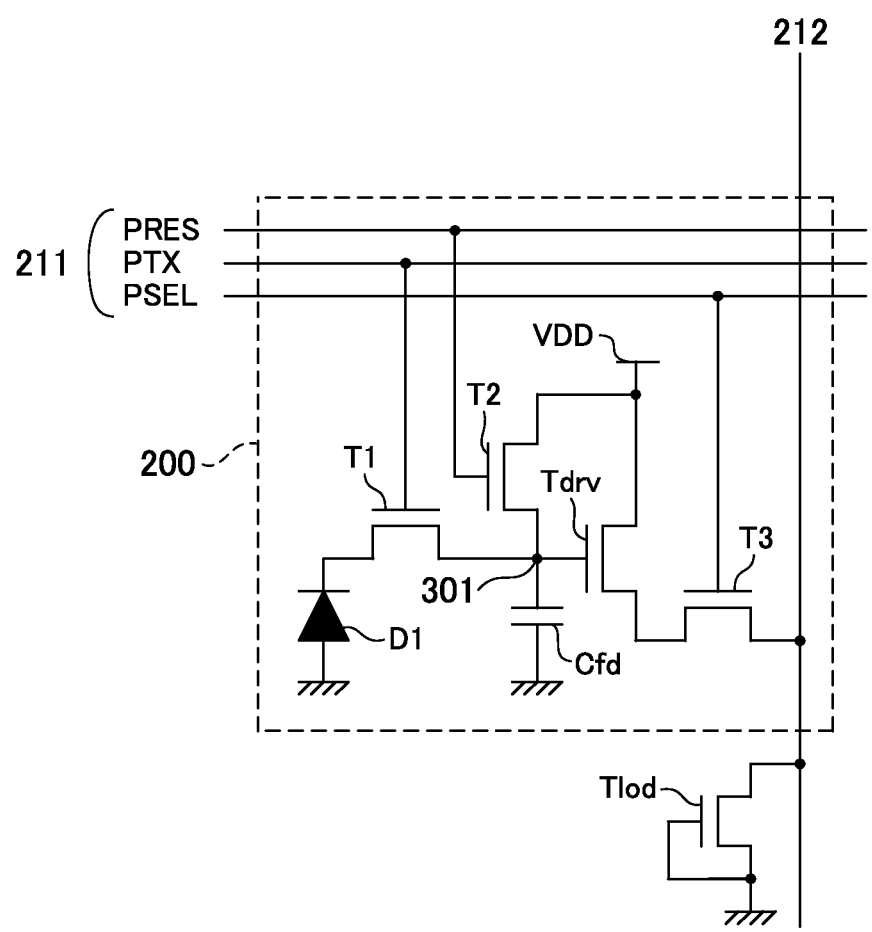
FIG. 3 is a circuit diagram showing a circuit configuration of a pixel according to the present embodiment.

FIG. 3 is a diagram showing a circuit configuration for a pixel 200 of the image capturing element 12. The pixel 200 that is encircled by the dotted rectangular frame is shown to represent one of the pixels that configures the pixel region 201. In addition, the pixel 200 is connected to the other circuits by the pixel control line 211 and the vertical signal line 212. The present embodiment is explained assuming that the P11 pixel is connected to the vertical signal line 212.

The vertical signal line 212 is connected to a loading circuit (refer to Tlod) and the column signal processing unit 203, along with being mutually connected to the vertical pixel columns, and outputs the signal for the pixel 200. The pixel control line 211 is connected to the vertical scanning unit 202 along with being mutually connected to the one horizontal row of pixels. Resetting and signal read out are made possible by simultaneously controlling the pixels of the one horizontal row. FIG. 3 shows a reset control line PRES, a transmission control line PTX, and a vertical select line PSEL together as the pixel control lines 211.

A photo electric conversion element (labelled as D1) is a photodiode (referred to as a PD), and converts light into an electric charge along with accumulating the converted electric charge. In the photoelectric conversion element D1, the p side (anode) of the PN junction is connected to the GND (ground), and the N side (cathode) of the PN junction is connected to the source for a transmission transistor T1.

The transmission transistor T1 functions as a transmission switch element. In the transmission transistor T1, the gate is connected to the transmission control line PTX, and the drain is connected to a floating diffusion (herein abbreviated as "FD") capacitance Cfd. The transmission transistor T1 controls the electric charge transmission from the photoelectric conversion element D1 to the FD capacitance Cfd. One terminal of the FD capacitance Cfd is connected to the GND (ground), and it converts the electric charge that has been transmitted from the photoelectric conversion element D1 into a voltage. Below, the connection point for the drain of the transmission transistor T1 and the FD capacitance Cfd will be referred to as an FD node 301.

A reset transistor T2 functions as a reset switch element. In the reset transistor T2, the gate is connected to the reset control line PRES, the drain is connected to the terminal for the voltage power supply VDD, the source is connected to the FD node 301, and electric potential for the FD node 301 is reset to the voltage power source VDD.

A drive transistor Tdrv is a transistor that configures a pixel internal amplifier. In the drive transistor Tdrv, the gate is connected to the FD node 301, the drain is connected to the terminal of the voltage power supper VDD, the source is connected to the drain of a select transistor T3, and a voltage is output according to the voltage of the FD capacitance Cfd.

The select transistor T3 functions a selection switch element. In the select transistor T3, the gate is connected to a vertical select line PSEL, the source is connected to the vertical signal line 212, and the output from the drive transistor Tdrv is output to the vertical signal line 212 as an output signal from the pixel 200.

The loading circuits that are provided for each of the vertical signal lines 212 are configured by a load transistor Tlod. In the load transistor Tlod, the source is connected to the gate, and the drain is connected to the vertical signal line 212. The load transistor Tlod configures both the drive transistor Tdrv for the pixels 220 from the column that is connected to the vertical signal line 212, and the source follower circuit that is a pixel internal amplifier. When a signal for the pixel 200 is output, the load transistor Tlod operates as a constant current source for the gate ground.

The transistors other than the drive transistor Tdrv and the load transistor Tlod operate as switch elements. These transistors conduct electricity (ON) when the signal level for the control line that is connected to the gate is at a high level, and discontinues the electrical flow (OFF) when it is at a low level.

Figure 4:
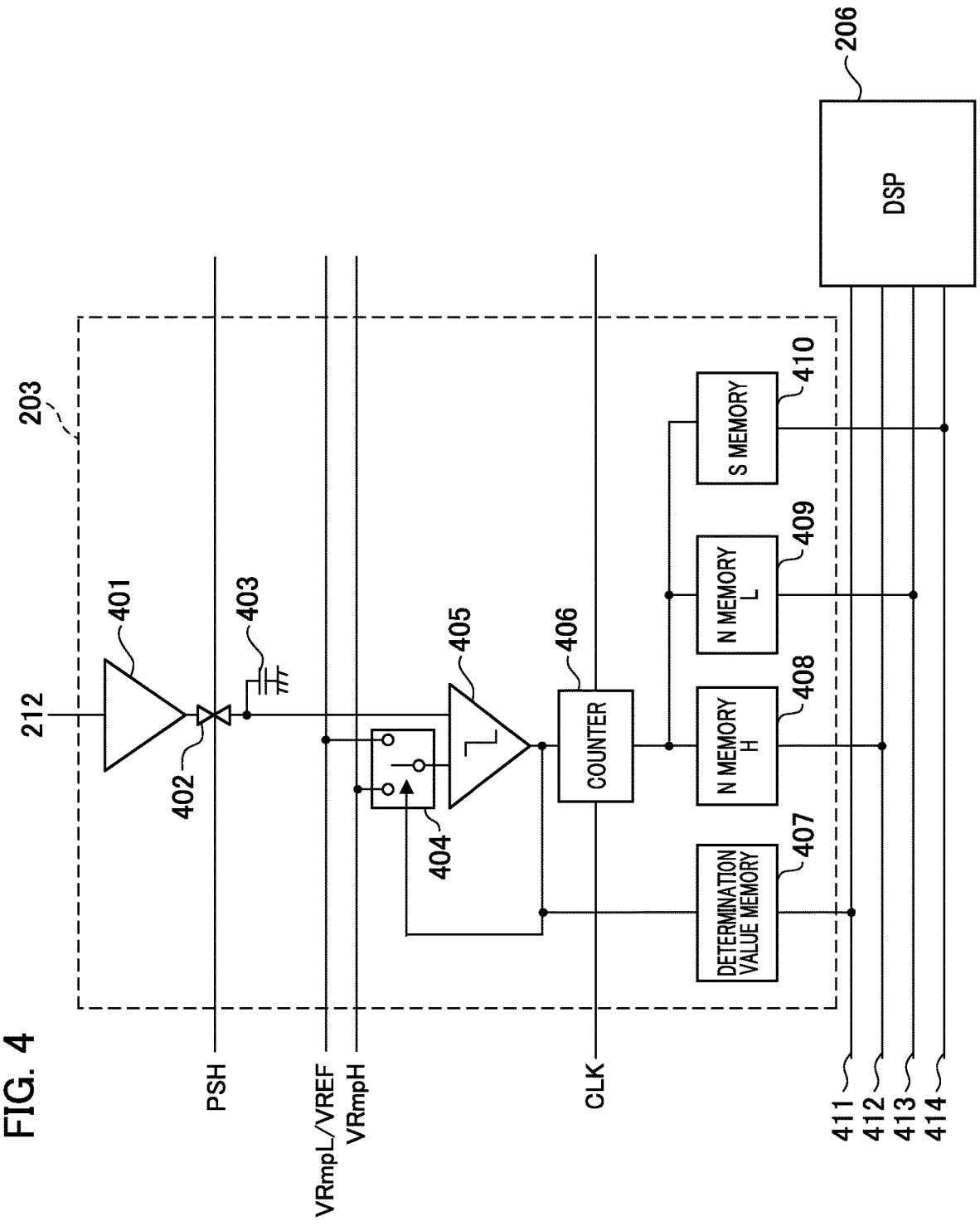
FIG. 4 is a diagram showing a circuit configuration for a column signal processing unit according to the present embodiment.

FIG. 4 is a diagram showing a circuit configuration for a column signal processing unit 203 of the image capturing element 12. In the column signal processing unit 203, the image signal that has been output from the vertical signal line 212 is input into an amplifier 401. The amplifier 401 amplifies the image signal from the vertical signal line 212. The output terminal of the amplifier 401 is connected to a switch 402, and a capacitance 403 is connected to the switch 402. The on/off state of the switch 402 is determined by the control signal PSH. The capacitance 403 is used in order to maintain the image signal voltage. The writing of the signal voltage to the capacitance 403 is controlled by the switch 402, which is turned on/off by the control signal PSH.

A comparator 405 has a first and a second input terminal. A signal is input into the first input terminal according to the selection results of the select circuit 404. The select circuit 404 selects and outputs the reference voltage VREF that is provided by the slope voltage generating unit 204 in FIG. 2, or the slope voltage VRmpL or VRmpH, which are reference voltages. The operations of the select circuit 404 will be described in detail below. In addition, the output from the amplifier 401 that has been written to the capacitance 403 is input into the second input terminal of the comparator 405.

The comparator 405 compares the output from the amplifier 401 with the reference voltage VREF and the slope voltage, which is a reference voltage, and outputs one of the two values of low level or high level according to the size relationship thereof. Specifically, in the case in which the voltage that has been input into the comparator 405 from the select circuit 404 is small in comparison to the output from the amplifier 401, the comparator 405 outputs the low level. In addition, in the case in which voltage that has been input unto the comparator 405 from the select circuit 404 is large in comparison to the output from the amplifier 401, the comparator 405 outputs the high level. The output from the comparator 405 is provided to each of a counter 406, a determination value memory 407, and the select circuit 404.

The clock (the signal therefor will be referred to below as CLK) starts operations at the same time that the transition to the slope voltage, which is a reference voltage, starts, and the counter 406 performs a count operation for the CLK. When the output from the comparator 405 is a high level, the counter 406 performs a count up operation in response to the CLK, and the count operation is stopped at the same time that the output of the comparator 405 is inverted to a low level (the size relationship is reversed).

The determination value memory 407 records and retains the signal for the determination result of the comparator 405. For example, it retains the signal that shows the results that have been determined by the comparator 405 from the reference voltage VREF and the output from the amplifier 401.

An N memory H 408, an N memory L 409, and an S memory 410 are connected to the counter 406. The N memory H 408 retains, for example, a digital signal in which the reset level signal (referred to below as an N signal) of the FD has been AD converted by using the slope voltage VRmpH. In addition, the N memory L 409 retains a digital signal in which for example, the N signal of the FD 304 has been AD converted by using the slope voltage VRmpL. In addition, the S memory 410 retains a digital signal in which the signal of the photoelectric conversion element D1 has been superimposed onto the N signal of FD (referred to below as the S signal) has been AD converted by using the slope voltage VRmpL or VRmpH. The signals that are retained by the determination value memory 407, the N memory H 408, the N memory L 409, and the S memory 410 will be described in detail below.

The signals that have been retained by the determination value memory 407, the N memory H 408, the N memory L 409, and the S memory 410 are sent to the DSP 206 via the horizontal output lines 411, 412, 413, and 414 respectively by the control signal from the horizontal scanning unit 205. In the DSP 206, the N signal is subtracted from the S signal, and a signal is output in which the reset noise components from the FD, which are the cause of noise, have been removed. Note that the processing of the DSP 206 will be described below.

Next, the read out operation of the electric charge from one row of pixels 200 of the image capturing element 12 will be explained. The image capturing element 12 in the present embodiment has two AD conversion modes. The first AD conversion mode is a mode that performs AD conversion by selecting a slope voltage from a plurality of types according to the output level of the signal. Below, an example of a dual slope method that uses two slope voltages will be explained. The second AD conversion mode is a mode that performs AD conversion by using a single slope voltage regardless of the signal output level.

Figure 5:
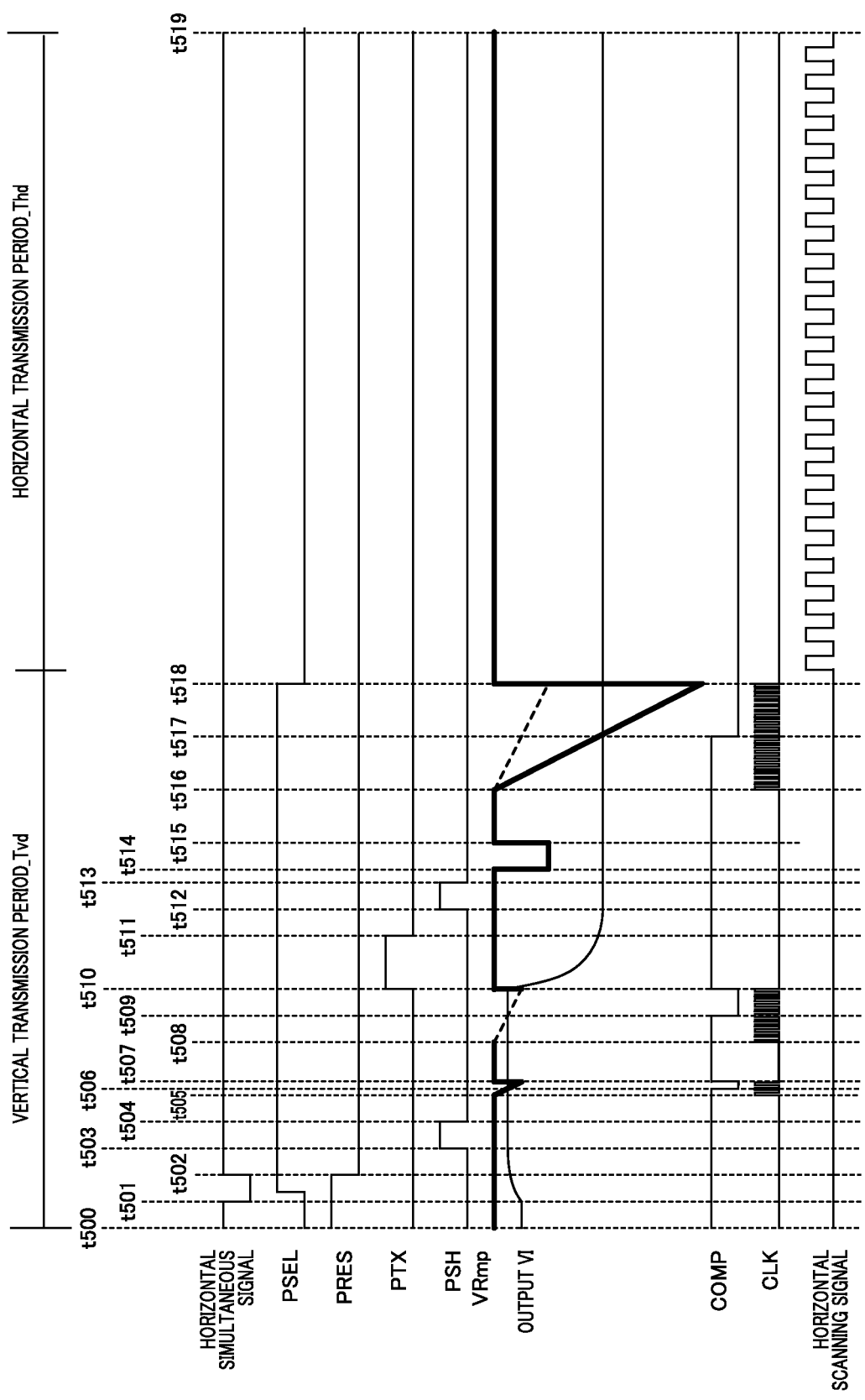
FIG. 5 is a timing chart during a multiple slope AD conversion mode.
Figure 6:
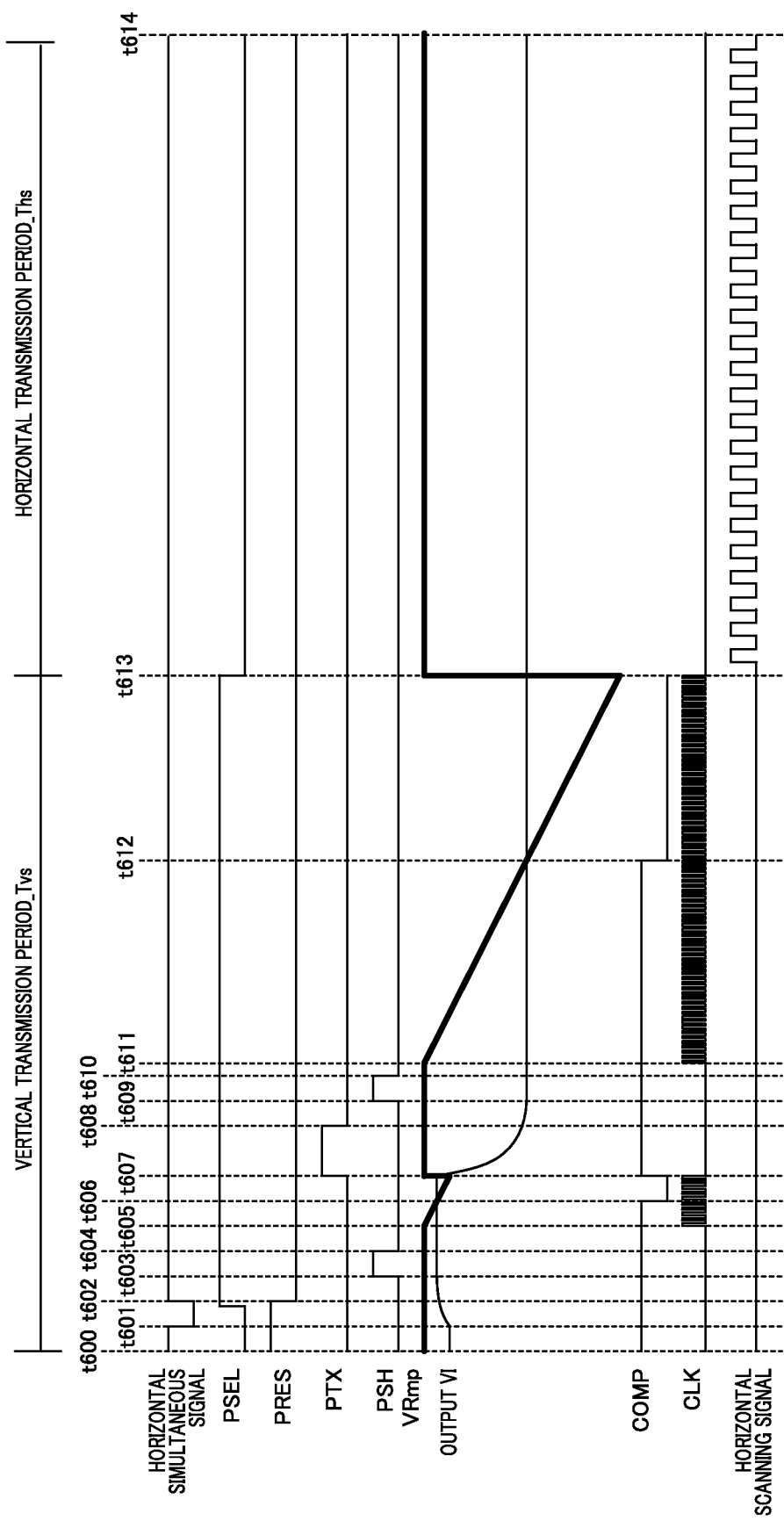
FIG. 6 is a timing chart during a single slope AD conversion mode.

FIG. 5 and FIG. 6 are timing charts that show examples of electric charge read out operations in each AD conversion mode. The changes over time for a horizontal synchronization signal, the signals for each of the control lines PSEL, PRES, and PTX, the control signal PSH, the slope voltage VRmp, the electric potential V1 that is output from the amplifier 401, the output levels COMP and CLK from the comparator 405, and the horizontal scanning signal are schematically shown. The slope voltage VRmp includes the reference voltage VREF. In addition, the time period from the time t500 until t518, and the time period from time t600 until t613 in each of FIG. 5 and FIG. 6 both show the vertical transmission period until the AD conversion of the image signal (refer to Tvd and Tvs). The time period from the times t518 until t519 and the time period from the times t613 until t614 in FIG. 5 and FIG. 6 both show the horizontal transmission period (refer to Thd, and Ths) for the external read out of the AD converted signal.

FIG. 5 is a timing chart showing an example of an electric charge read out operation in the first AD conversion mode (the multiple slope method AD conversion mode). Below, in relation to the levels of a binary signal, the high level will be denoted Hi, and the low level will be denoted Lo. At the time t500, the control signal PRES for the reset transistor T2 becomes Hi prior to the read out of the signal from the PD (photoelectric conversion element D1). The voltage of the FD node 301 is thereby reset to a reset power source voltage VDD.

The control signal PSEL becomes Hi during the time period from the time t501 until the time t502, and the drive transistor Tdrv is put into an operation mode. Then, at the time t502, the reset of the FD capacitance Cfd is released by the control signal PRES becoming Lo. The electric potential of the FD at this time is read out by the vertical signal line 212 to serve as a rest signal level (N signal), and is input into the column signal processing unit 203, which configures a readout circuit.

The control signal PSH becomes Hi at the time t503, and Lo at the time t504. The control signal PSH is the signal that is input into the column signal control unit 203 from the timing unit 207. The switch 402 (FIG. 4) is turned on at the time t503, and is turned off at the time t504. The N signal that has been read out by the vertical signal line 212 is thereby retained by the capacitance 403 after being amplified by a desired gain in the amplifier 401. The N signal that has been retained by the capacitance 403 is provided to the comparator 405 to serve as one of the inputs.

After the switch 402 has been turned off at the time t504, during the time period from the time t505 to the time t507, the slope voltage generating unit 204 decreases the slope voltage VRmpH (refer to the solid line) from the initial value along with the progression of time. Note that the slope voltage generating unit 204 is able to simultaneously generate and provide the column signal processing unit 203 with a plurality of slope voltages with different inclinations. The slope voltage with the relatively largest absolute value for inclination is expressed as VRmpH, and the slope voltage with the relatively smallest absolute value for inclination is expressed as VRmpl. In the present embodiment, first the slope voltage VrmpH is generated, and then input into the comparator 405 via the select circuit 404 of the column signal processing unit 203.

At the time t505, the transition to the slope voltage VRmpH starts, and the CLK is provided to the counter 406. The value from the counter 406 increases according to the number of counted CLKs. The slope voltage VRmpH that has been input into the comparator 405 becomes the same level as the N signal at the time t506. At this time, the output COMP from the comparator 405 becomes Lo, and the operations of the counter 406 are stopped at the same time. The count value from the time when the operations of the counter 406 were stopped becomes the value that has been AD converted by the N signal referencing the slope voltage VRmpH, and is retained by the N memory H 408 to serve as the N signal for use in the slope voltage VRmpH.

The time period for the N signal for use in the slope voltage VRmpH ends at the time t507. After the counter 406 has been reset, the slope voltage generating unit 204 generates the slope voltage VRmpL. The slope voltage VRmpL is input into the comparator 405 via the select circuit 404 of the column signal processing unit 203. During the time period from the time t508 until the time t510, the slope voltage generating unit 204 decreases the slope voltage VRmpL (refer to the dotted line) from the initial value along with the passage of time.

At the time t508, the transition to the slope voltage VRmpL starts, and the CLK is provided to the counter 406. The value for the counter 406 increases according to the number of counted CLKs. At the time t509, the slope value VRmpL that has been input into the comparator 405 becomes the same level as the N signal. At this time, the output COMP from the comparator 405 becomes Lo, and at the same time, the operations of the counter 406 stop. The count value from the time at which the operations of the counter 406 have stopped becomes the value that has been AD converted by the N signal by referencing the slope voltage VRmpL, and is retained by the N memory L 409 to serve as the N signal for use in the slope voltage VRmpL.

After the digitalized N signal has been retained by each N memory (408, and 409), the control signal PTX becomes Hi at the time t510, and at the time t511, the control signal PTX becomes Lo and the photoelectric charge that has accumulated in the PD is transmitted to the FD. The electric potential fluctuation of the FD according to the electric charge amount is read out by the vertical signal line 212 to serve as the S signal level (light components+reset noise components (N signal)), and is input into the column signal processing unit 203.

The amplifier 401 amplifies the S signal by a desired gain. At the time t512, the switch 402 is turned on due to the control signal PSH becoming Hi, and at the time t513, the switch 402 is turned off due to the control signal PSH becoming Lo. Thereby the electric potential that has been retained in the capacitance 403 is input into one of the terminals of the comparator 405.

After the switch 402 is turned off at the time t513, during the time period from the time t514 until the time t515, the reference voltage VREF is input into the other terminal of the comparator 405. The reference voltage VREF is generated by the slope voltage generating unit 204, and is input into the comparator 405 via the select circuit 404 of the column signal processing unit 203.

Next, during the time period from the time t516 until the time t518, the slope voltage generating unit 204 reduces the slope voltage VRmpL and VRmpH from their respective initial values along with the passage of time.

In the column signal processing unit 203, which from among the slope voltage VRmpH and VRmpL will be input into the comparator 405 is determined according to the value for the output COMP from the comparator 405 during the time period from the time t514 until the time t515. Below, the value for the output COMP from the comparator 405 will be explained as the logical values "1" or "0".

For example, in the case of FIG. 5, upon comparing the levels of the output V1 and the reference voltage VREF (reference value), they are "reference voltage VREF>output V1" during the time period from the time t514 until the time t515. Thus, the output COMP becomes Hi (the logical value "1"). The output COMP is input into the select circuit 404 (refer to FIG. 4), and in the case in which value of the output COMP is the logical value "1", the select circuit 404 selects and provides the comparator 405 with the slope voltage VRmpH, which has the relatively larger inclination.

In contrast, in the case in which the output V1 is greater than or equal to the reference voltage VREF (greater than or equal to the reference value), that is, when the output COMP is Lo (the logical value "0"), the select circuit 404 selects and provides the comparator 405 with the slope voltage VRmpL, which has the relatively smaller inclination. In this context, the logical value that is the value for the output COMP during the time period from the time t514 until the time t515 is expressed as the determination value J. The signal for the determination value J is input into the select circuit 404, and retained by the determination value memory 407.

Although it is not shown in FIG. 4, control to input the output of the comparator 405 into the select circuit 404 and the determination value memory 407 may also be performed only during the time period from the time t514 until the time t515 by the provision of a separate switch.

In FIG. 5, at the time t516, the transition to the slope voltage VRmpH starts, and the CLK is provided to the counter 406. The value for the counter 406 increases according to the number of counted CLKs. At the time t517, the slope voltage VRmpH, which is a reference voltage that has been input into the comparator 405, is at the same level as the S signal. At this time, the output COMP from the comparator 405 becomes Lo, and the operations of the counter 406 stop at the same time. The count value for the time when the operations of the counter 406 stopped becomes the value that has been AD converted by the S signal, and is retained on the S memory 410.

Next, from the time t518, the signals that are retained on the determination value memory 407, the N memory H 408, the N memory L 409, and the S memory 410 are read out by the horizontal scanning unit 205. The signals that are retained by each of the memories from 407 to 410 are sent to the DSP 206 by the horizontal output lines 411, 412, 413, and 414 respectively.

The DSP 206 calculates a differential signal (pixel signal for the light components) by subtracting the N signal from the S signal. At this time, the N signal value from the N memory H 408 or the N memory L 409 is selected to serve as the N signal value that will be subtracted from the S signal based on the determination value J that is retained on the determination value memory 407. In the case in which the determination value J is the logical value "1", the slope voltage VRmpH is selected, and the DSP 206 subtracts the N signal value of the N memory H 408 from the S signal value from the S memory 410. In addition, in the case in which the determination value J is the logical value "0", the slope value VRmpL is selected, and the DSP 206 subtracts the N signal value of the N memory L 409 from the S signal value from the S memory 410. After the above-described subtractions, the DSP 206 performs correction processing on the AD conversion results according to the slope voltage that was selected at the time of the AD conversion of the S signal.

In this context, the correction processing for the AD conversion results will be explained. For example, a case will be assumed in which the inclination for the slope voltage VRmpH is four times the inclination for the slope voltage VRmpL. In this case, the signal amplitude corresponding to one CLK, that is an output one count, will be four times larger in the case of VRmpH. Due to this, the DSP 206 performs processing to make the digital gain in relation to the value of the differential signal that has been obtained by the VRmpH four times larger, in order to adjust the digital outputs in relation to the electric potential level of the signal so as to match.

The DSP 206 determines whether or not correction processing is necessary for the differential signal that has been calculated. Determination can be performed based on the determination value J that has been retained by the determination value memory 407. In the case in which the determination value J is the logical number "1", the slope voltage VRmpH will be selected, and therefore, processing to increase the digital gain in relation to the differential signal by four times is executed. In the case in which the determination value J is the logical value "0", the slope voltage VRmpL is selected, and therefore the four times gain setting processing is not performed.

After the calculation processing by the DSP 206 is performed, during the time period from the time t518 until the time t519, the data for one row of pixel signals is output to the outside of the image capturing element 12.

In the present embodiment, it is possible to arbitrarily set the level of reference voltage VREF for obtaining the determination value J. For example, in the case in which the inclination for the slope voltage VRmpH is four times that of the inclination of the slope voltage VRmpL, the reference voltage VREF may be set to one quarter or more of the output signal amplitude to be AD converted. In the case in which the reference voltage VREF has been made one quarter of the output signal amplitude, if the amplitude for the output signal to be AD converted was made 1 [V], the reference voltage VREF is set to correspond to an amplitude of 0.25 [V].

For example, in the case in which the counter at the time of AD conversion is made a 12-bit counter, and is configured to count until 4095, control is performed so that the amplitude of the slope voltage VRmpL becomes 0.25 [V] at the 4095 count. In addition, control is performed so that the amplitude of the slope voltage VrmpH becomes 1 [V] at the 4095 count. In the case in which AD conversion is performed using such a configuration, as the results from after the correction processing, output results can be obtained per one count from 0 to 4095 at a small amplitude of 0.25 [V] or smaller, that is, at a low luminance output. In addition, output results can be obtained per four counts from 4096 to 16380 at a large amplitude that is larger than 0.25 [V] and equal or less than 1 [V], that is, at a high luminance output. In this manner, although the resolution for high luminance outputs is rougher than the resolution for low luminance outputs, it is possible to perform AD conversion without taking the time until the 14-bit equivalent count.

At the time t518, the signal level of the control line PSEL that is being provided to this row becomes Lo, the vertical transmission is completed, and the read out for the vertical transmission for the next row starts.

Next, the electric charge read out operation in the second AD conversion mode (the single slope method AD conversion mode) will be explained in reference to FIG. 6. FIG. 6 is a timing chart that shows an example of an electric charge read out operation in the second AD conversion mode. Note that the operations that occur during the time period from the time t600 until the time t605 are the same as the operations that occur during the time period from the time t500 until the time t505 in FIG. 5, and therefore, explanations thereof will be omitted. In addition, the single slope voltage VRmp will be explained as VRmpL.

At time t605, the transition to the slope voltage VRmpL starts, the CLK is provided to the counter 406, and the value for the counter 406 increases according to the number of counted CLKs. At the time t606, the slope value VRmpL that has been input into the comparator 405 is at the same level as the N signal. At this time, the output COMP from the comparator 405 becomes Lo, and at the same time, the operations of the counter 406 stop. The count value from the time at which the operations of the counter 406 stopped becomes the value that has been AD converted by the N signal referencing the slope voltage VRmpL, and is retained in the N memory L 409 to serve as the N signal for use in the slope voltage VRmpL.

After the digitalized N signal has been retained by the N memory L 409, the signal for the control line PTX becomes Hi at the time t607, the signal for the control line PTX becomes Lo at the time t608, and the photoelectric charge that has accumulated in the PD is transmitted to the FD. The electric potential fluctuations of the FD according to the electric charge amount are read out by the vertical signal line 212 to serve as the S signal level (light components+reset noise components (N signal)), and are input into the column signal processing unit 203. The S signal is amplified by a desired gain in the amplifier 401.

At the time t609, the switch 402 is turned on by the control signal PSH becoming Hi, and at the time t610, the switch 402 is turned off by the control signal PSH becoming Lo. The electric potential that was retained in the capacitance 403 is input into one terminal of the comparator 405.

During the time period from the time t611 until the time t613, the slope voltage generating unit 204 decreases the slope voltage VRmpL from its initial value along with the passage of time. In the second AD conversion mode, AD conversion is performed with a single slope voltage as the reference voltage. Thereby, it is not necessary to perform AD conversion of the N signal for use in the slope voltage (VRmpH) that has not been selected, or determinations and drive for inputting the reference voltage VREF as in the first AD conversion mode.

In addition, in the second AD conversion mode, with only one kind of slope voltage, the slope voltage generating unit 204 generates and supplies the column signal processing unit 203. That is, the slope voltage VRmpL is input into one terminal of the comparator 405 via the select circuit 404.

The transition to the slope voltage VRmpL starts, and the counter 406 is provided with the CLK. The value of the counter 406 increases according to the number of counted CLKs. At the time t612, the slope voltage VRmpL, which is the reference voltage that has been input into the comparator 405, is at the same level as the S signal. At this time, the output COMP of the comparator 405 becomes Lo, and at the same time, the operations of the counter 406 stop. The count value for the time at which the operations of the counter 406 has stopped becomes the value that the S signal has AD converted, and is retained by the S memory 410, which is the memory for the S signal.

Next, the signals that have been retained by the N memory L 409 and the S memory 410 are read out by the horizontal scanning unit 205. The signals that have been retained by the N memory L 409 and the S memory 410 are sent to the DSP 206 via the horizontal output lines 412, and 413 respectively by sequentially operating the column signal processing unit 203 from the time 1613 to the time t614. The DSP 206 performs processing to calculate a differential signal (pixel signal for the light components) by subtracting the N signal from the S signal, and the like. After processing by the DSP 206, the signal is output outside of the image capturing element 12.

As has been described above, the image capturing apparatus 1 of the present embodiment has a multiple slope method AD conversion mode and a single slope method AD conversion mode in relation to the image capturing element 12. It is possible to realize both high image quality and an increase in the read out speed by selecting the AD conversion method that is suited to the drive mode according to the operation conditions.

First Embodiment

In the present embodiment, a control that makes a read out that has been sped up possible by the selection of the multiple AD conversion mode according to the relationship between the vertical transmission period and the horizontal transmission period will be explained. The read out operations during the vertical transmission period and the horizontal transmission period that were explained using FIG. 5 and FIG. 6 are sequentially performed for each row. For example, the row that includes the P11 pixel that is shown in FIG. 2 will be made the first row, and the row that includes the p21 pixel will be made the second row. In this case, the vertical transmission operation for the second row of the pixel area 201 is started by the control of the vertical scanning unit 202 after the vertical transmission period for the first row.

In the present embodiment, the horizontal transmission of the first row and the vertical transmission of the second row are performed during the same time period, and sequential operations are performed until the horizontal transmission for the nth row has been completed. At this time, the length of the vertical transmission period (the vertical transmission time), is the amount of time that the AD conversion of the pixel signal takes, and therefore, it is not dependent on the number of horizontal pixels to be read out. In contrast, the length of the horizontal transmission period (the horizontal transmission time) is the time that it takes for the pixel signal for the one horizontal row to be externally transmitted, and therefore, the amount of time taken differs according to the number of pixels to be read out. That is, the size relationship between the vertical transmission time and the horizontal transmission time changes according to the number of horizontal pixels to be read out.

The length of the vertical transmission period until the AD conversion of the pixel signal, which is time period from the time t500 until the time t518 shown in FIG. 5, is expressed as Tvd. The length of the horizontal transmission period in which the AD converted signal is externally read out, and which is the time period from the time t518 until the time t519 that is shown in FIG. 5, is expressed as Thd. The length of the vertical transmission period until the AD conversion of the pixel signal that is the time period from the time t600 until the time t613 that is shown in FIG. 6 is expressed as Tvs. The horizontal transmission period during which the AD converted signal is externally read out, and which is the time period from the time t613 until the time t614 shown in FIG. 6, is expressed as Ths.

In FIG. 6, in the case in which "Tvs>Ths", it is possible to shorten the pixel signal read out time by switching from the second AD conversion mode to the first AD conversion mode, and therefore, it is possible to increase the read out speed. In addition, in the case in which "Tvs≤Ths", the horizontal transmission period is rate limited, and therefore, it is not possible to realize an increase in speed even if the second AD conversion mode is switched to the first AD conversion mode.

Recent image capturing apparatuses such as digital cameras and the like have a variety of drive modes. For example, there are modes such as still image and 4K video, FHD video, and the like, and it is possible to arbitrarily set these by user operations. Optimization by changing the pixel number that is read out from the image capturing element according to each of these drive modes is standard. In the present embodiment, a read out control for a pixel signal that has been sped up is performed by the selection of the AD conversion mode according to the relationship between the vertical transmission period and horizontal transmission period in the drive mode.

Figure 7:
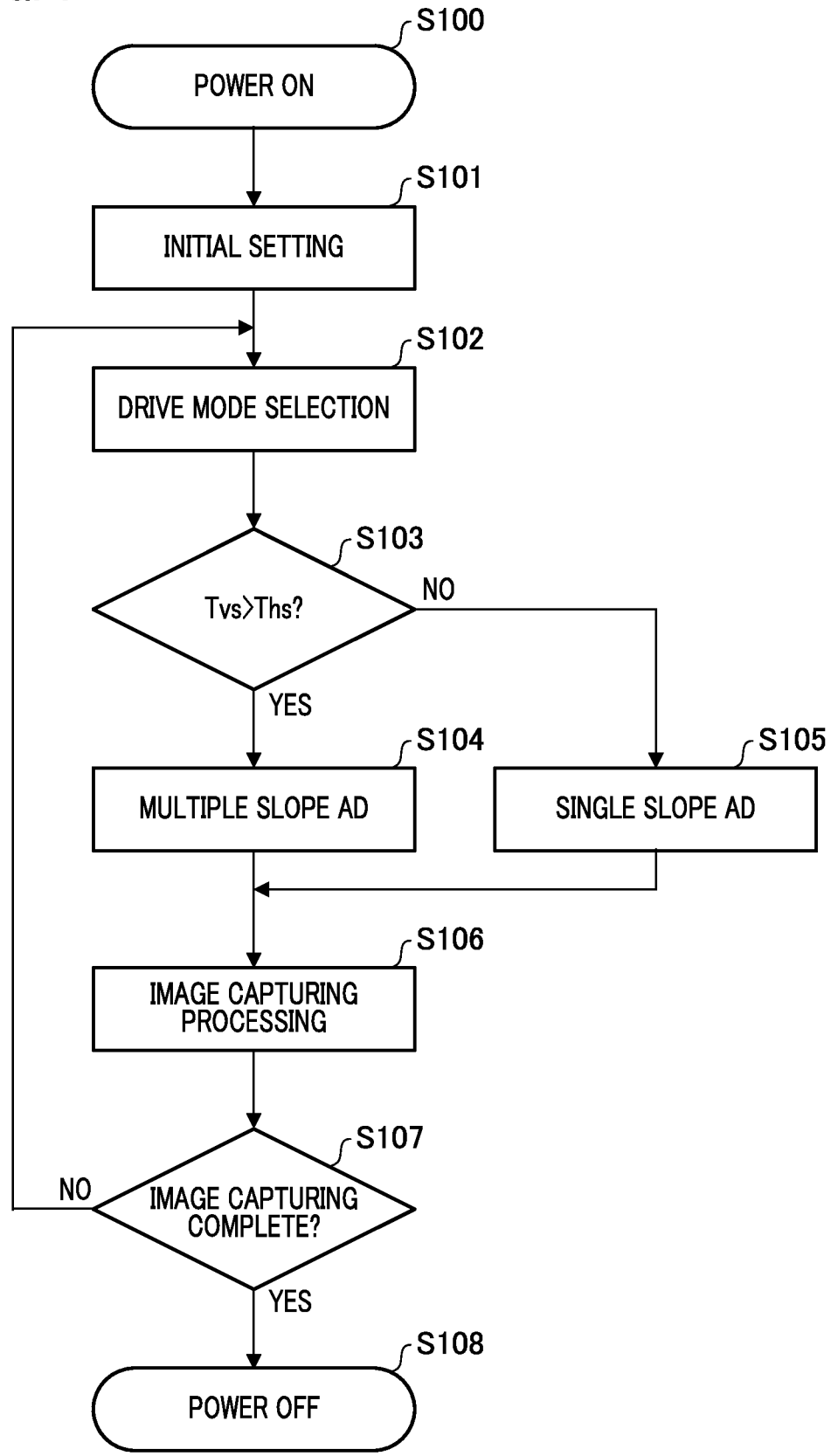
FIG. 7 is a flow chart explaining the operations in a First Embodiment.

The operations of the present embodiment will be explained with reference to the flowchart in FIG. 7. The processing starts in S100. The user performs an ON operation for the power source button that is included in the operating unit 16 of the image capturing apparatus. Next, in S101, after each type of initial setting has been performed, a drive mode is selected in accordance with a user operation (S102)

In S103, the synchronous control unit 15 determines the size relationship between the pre-set length Ths of the horizontal transmission period and the length Tvs of the vertical transmission period according to the drive mode that has been selected in S102. In the case in which the length Tvs of the vertical transmission period is longer than the length Ths of the horizontal transmission period in the drive mode that has been selected, the processing proceeds to S104. In addition, in the case in which Tvs is equal to or smaller than Ths, the processing proceeds to S105.

In S104, the synchronous control unit 15 selects the first AD conversion mode. In addition, in S105, the synchronous control unit 15 selects the second AD conversion mode. After S104, and S105, the processing proceeds to S106.

In S106, the synchronous control unit 15 performs control for the drive mode that was selected in S102 in accordance with the AD conversion mode that was selected in S104 or S105, and image capturing processing (development processing, recording processing, and the like) is executed.

In S107, the synchronous control unit 15 performs an image capturing completion determination. In the case in which the continuation of image capturing has been determined, the processing returns to S102 and continues. In the case in which the completion of image capturing has been determined, the processing proceeds to S108. Image capturing is completed after the power source has been turned OFF.

In the present embodiment, it is possible to realize a read out control that has been sped up by selecting the AD conversion mode according to the relationship between the vertical transmission period and the horizontal transmission period. Note that in the present embodiment, one example of a control that changes the length of the horizontal transmission period has been explained by using the number of pixels that are read out in the horizontal direction. Other than this, the application of a similar control is also possible by changing the output bit number for the pixel signal when output from the image capturing element, or the output bit rate at the time of the output.

Second Embodiment

Next, an image capturing apparatus in which it is possible to reduce the effect of gradation difference by selecting the AD conversion mode according to the resolution of the AD conversion will be explained as the second embodiment. In the present embodiment, it is possible to switch the resolution at the time of AD conversion using the synchronous control unit 15.

Recent image capturing apparatuses such as digital cameras and the like have a plurality of drive modes relating to still images, videos, and the like. For example, there is a still image drive mode in which relative importance is placed on the image quality, and a video image drive mode that requires high speed, and the resolution of the AD conversion can be changed according to the drive mode. During the still image drive mode, it is possible to retain the dynamic range of the pixel signal by making the bit resolution of the AD conversion greater than or equal to 14 bits. In addition, during the video drive mode, it is standard to make the bit resolution of the AD conversion equal to or less than 12 bits with the purpose of improving the processing speed and frame rate.

In addition, one of the problems that occurs during the first AD conversion mode is that, in the case in which the gradation changes before or after the slope has been switched, there is a possibility that the gradation difference will affect the image. In particular, in the case in which the AD conversion resolution is low, gradation differences frequently occur.

For example, a case is assumed in which the bit resolution of the AD conversion is 14 bits. In this case, the dynamic range of the pixel signal will be 16383 LSB. In the first AD conversion mode, the value for when the VRmpL and the VRmpH (the inclination is made four times that of the VRmpL) are switched is made 16384/4=4096 LSB. The bit accuracy for the signal value at 4096 LSB or more becomes four times rougher, and in the vicinity of 4096 LSB, which is the vicinity of the switch point, a difference of at most 4 LSB occurs due to the switching between VRmpL and VRmpH.

In addition, it is assumed that the bit resolution for the AD conversion is 12 bits. In this case, the dynamic range for the pixel signal becomes 4095 LSB. In the first AD conversion mode, the value for when the VRmpL and the VRmpH (the inclination is made four times that of VRmpL) are switched is made 4096/4=512 LSB. The bit accuracy for the signal value becomes four times rougher at 512 LSB or more, and in the vicinity of 512 LSB, which is the vicinity of the switch point, a difference of at the greatest 4 LSB occurs due to switching between the VRmpL and the VRmpH.

In the case in which the relationship between the inclination of the VRmpL and the inclination of the VRmpH is constant (in the present example it is four times), the same amount of gradation difference will occur at the switch point for the VRmp regardless of the resolution for the AD conversion. Therefore, in the case in which the resolution for the AD conversion is low, the ratio for the gradation difference will become large, and therefore, the roughness of the gradation will be noticeable in the image. Therefore, in the present embodiment, an image capturing apparatus will be explained in which it is possible to control the effect of the gradation difference (non-smooth connection) on the image by the selection of the AD conversion mode according to the resolution of the AD conversion.

Figure 8:
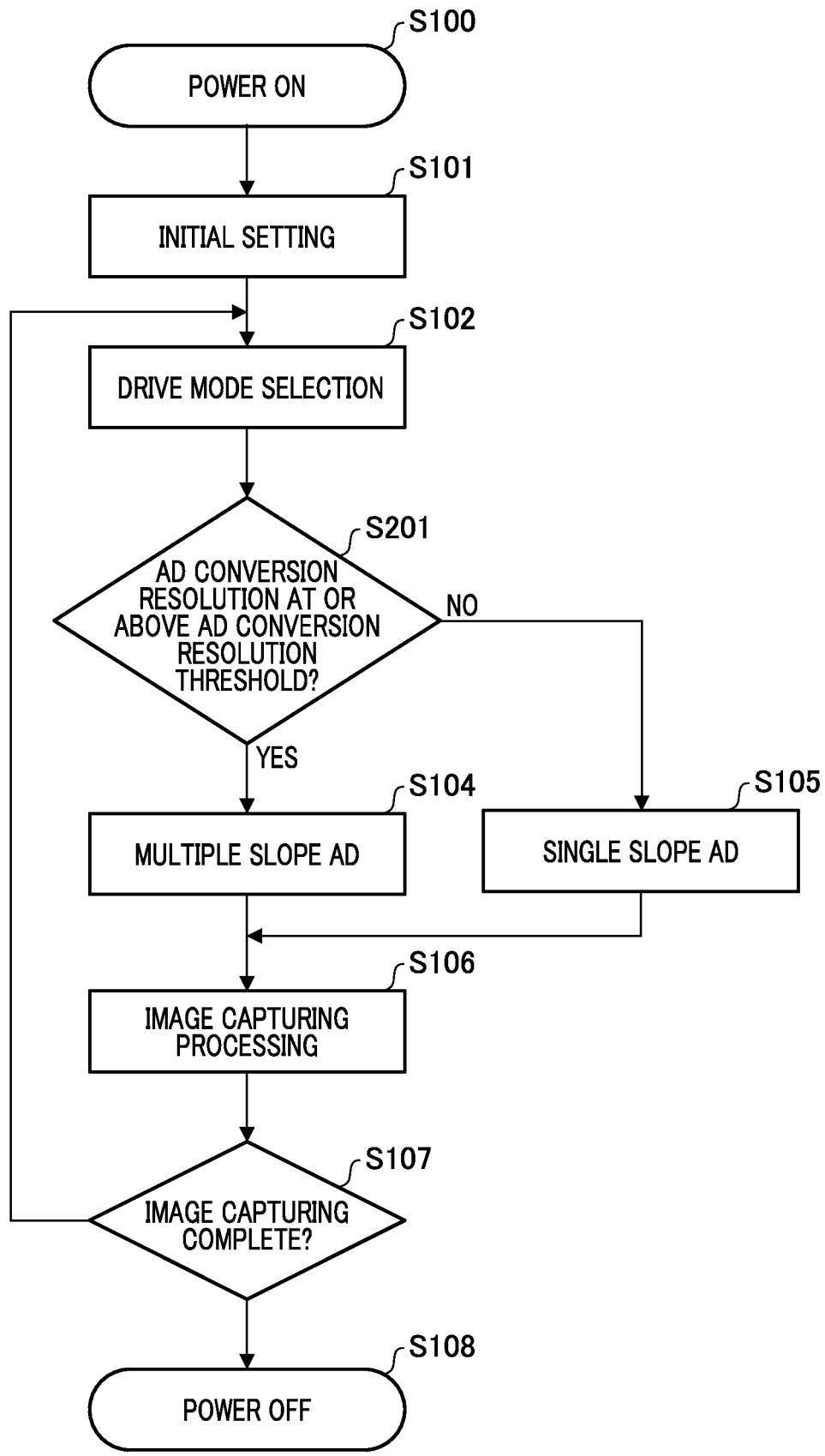
FIG. 8 is a flow chart explaining the operations in a Second Embodiment.

The operations of the present embodiment will be explained with reference to the flowchart in FIG. 8. Note that explanations of processing that is the same as that in FIG. 7 will be omitted, and the points that differ from the first embodiment will be explained. In S102, after the drive mode has been selected in accordance with a user operation, the processing proceeds to S201.

In S201, the synchronous control unit 15 determines whether or not the bit resolution for the AD conversion in the drive mode that has been selected in S102 is equal to or more than threshold (for example, 14 bit). In the case in which it has been determined that the bit resolution for the AD conversion in the drive mode that has been selected in S102 is equal to or more than the threshold, the processing proceeds to S104, and the first AD conversion mode is selected. In addition, in the case in which it has been determined that the bit resolution for the AD conversion in the drive mode that has been selected in S102 is less than the threshold, the processing proceeds to S105, and the second AD conversion mode is selected. After this, the processing from S106 to S018 is executed.

In the present embodiment, it is possible to perform a read out control that can control the effect of gradation difference in an image by selecting the first or the second AD mode according to the resolution for the AD conversion.

According to the present embodiment, it is possible to provide an image capturing apparatus that is able to realize both an increase in image quality and an increase in read out speed by selecting the AD conversion method that is suited to the operation conditions.

An image capturing apparatus according to the present embodiment has been explained above. However, various modes are possible, and the present invention is not limited to this example. For example, the invention may also be configured to select the AD mode that is suited to the drive mode according to the size relationships for the vertical read out line numbers, or the like, and is not limited to the temporal size relationship between the vertical transmission period and the horizontal transmission period, or the resolution for the AD conversion. For example, in the case in which the thinning number related to the vertical read out line number is equal to or more than threshold, the first AD conversion mode will be selected, and in the case in which the thinning number is less than the threshold, the second AD conversion mode will be selected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-163430, filed Oct. 4, 2021 which is hereby incorporated by reference herein in its entirety.

What is claimed is:

1. An image capturing apparatus comprising:
a converter configured to convert a pixel signal into a digital signal by comparing the pixel signal, which is output from a plurality of pixels of an image capturing element, with a slope voltage for which the electric potential changes with time; and
a controller configured to control the convertor using a plurality of modes corresponding to operation conditions for when the pixel signal is read out; wherein
in a first mode, the controller performs control for the conversion of the pixel signal performed by the converter by comparing a slope voltage selected from a plurality of slope voltages with the pixel signal;
in a second mode, the controller performs control of the conversion of the pixel signal performed by the convertor by comparing a pre-determined slope voltage with the pixel signal; and
the controller selects the first or second mode by comparing a first time period from the read out of the pixel signal of the image capturing element until the conversion by the convertor with a second time period for the transmission of the image signal that has been converted by the convertor.

2. The image capturing apparatus according to claim 1, wherein
the controller selects the first mode in the case in which the length of the first time period is longer than the length of the second time period, and selects the second mode in the case in which the length of the first time period is shorter than the length of the second period.

3. The image capturing apparatus according to claim 2, wherein, the first time period is a vertical transmission period relating to the pixel signal, and the second time period is a horizontal transmission period relating to the image signal; and wherein
   the controller selects the first or second mode according to a mode that reads out the pixel signal from the image capturing element.

4. The image capturing apparatus according to claim 1, the converter comprising:
   a select circuit configured to select a signal for any slope voltage from among the plurality of slope voltages;
   a comparator configured to compare the pixel signal with the signal that has been selected by the select circuit; and
   a counter configured to perform a count of the output of the comparator; wherein
   the select circuit selects the signal for the slope voltage according to the output of the comparator.

5. An image capturing apparatus comprising:
   a converter configured to convert a pixel signal into a digital signal by comparing the pixel signal, which is output from a plurality of pixels of an image capturing element, with a slope voltage for which the electric potential changes with time; and
   a controller configured to control the convertor using a plurality of modes corresponding to operation conditions for when the pixel signal is read out; wherein
   in a first mode, the controller performs control for the conversion of the pixel signal performed by the converter by comparing a slope voltage selected from a plurality of slope voltages with the pixel signal;
   in a second mode, the controller performs control of the conversion of the pixel signal performed by the convertor by comparing a pre-determined slope voltage with the pixel signal; and
   the controller selects the first or second mode according to the resolution from when the converter performed the conversion.

6. The image capturing apparatus according to claim 5, wherein
   the controller selects the first mode in the case in which the resolution is equal to or more than a threshold, and selects the second mode in the case in which the resolution is less than the threshold.

7. The image capturing apparatus according to claim 6, wherein
   the controller performs control so as to switch the resolution according to the read out mode of the pixel signal from the image capturing element.

8. The image capturing apparatus according to claim 7, wherein
   the controller performs control so as to switch to the first mode in a drive mode related to a still image, and to switch to the second mode in a drive model related to a video image.

9. The image capturing apparatus according to claim 5, the converter comprising:
   a select circuit configured to select a signal for any slope voltage from among the plurality of slope voltages;
   a comparator configured to compare the pixel signal with the signal that has been selected by the select circuit; and
   a counter configured to perform a count of the output of the comparator; wherein
   the select circuit selects the signal for the slope voltage according to the output of the comparator.

10. An image capturing apparatus comprising:
    a converter configured to convert a pixel signal into a digital signal by comparing the pixel signal, which is output from a plurality of pixels of an image capturing element, with a slope voltage for which the electric potential changes with time; and
    a controller configured to control the convertor using a plurality of modes corresponding to operation conditions for when the pixel signal is read out; wherein
    in a first mode, the controller performs control for the conversion of the pixel signal performed by the converter by comparing a slope voltage selected from a plurality of slope voltages with the pixel signal;
    in a second mode, the controller performs control of the conversion of the pixel signal performed by the convertor by comparing a pre-determined slope voltage with the pixel signal; and
    the controller selects the first or second mode according to the vertical read out line number for the image capturing element.

11. The image capturing apparatus according to claim 10, the converter comprising:
    a select circuit configured to select a signal for any slope voltage from among the plurality of slope voltages;
    a comparator configured to compare the pixel signal with the signal that has been selected by the select circuit; and a counter configured to perform a count of the output of the comparator; wherein
    the select circuit selects the signal for the slope voltage according to the output of the comparator.

12. A control method for execution in an image capturing apparatus provided with an image capturing element, the control method comprising:
    a converter converting a pixel signal into a digital signal by comparing the pixel signal, which is output from a plurality of pixels of the image capturing element, with a slope voltage for which the electric potential changes with time; and
    a controller controlling the converter using a plurality of modes corresponding to operation conditions for when the pixel signal is read out; wherein
    during the control,
    in a first mode, the controller performs control of the conversion of the pixel signal performed by the converter by comparing a slope voltage that has been selected from a plurality of slope voltages with the pixel signal;
    in a second mode, the controller performs control of the conversion of the pixel signal performed by the converter by comparing a pre-determined slope voltage with the pixel signal; and
    the controller selects the first or second mode by comparing a first time period from a read out of the pixel signal of the image capturing element until conversion by the converter with a second time period for transmission of the image signal that has been converted by the converter.

13. A control method for execution in an image capturing apparatus provided with an image capturing element, the control method comprising:
    a converter converting a pixel signal into a digital signal by comparing the pixel signal, which is output from a plurality of pixels of the image capturing element, with a slope voltage for which the electric potential changes with time; and a controller controlling the converter using a plurality of modes corresponding to operation conditions for when the pixel signal is read out; wherein during the control, in a first mode, the controller performs control of the conversion of the pixel signal performed by the convertor by comparing a slope voltage that has been selected from a plurality of slope voltages with the pixel signal;

in a second mode, the controller performs control of the conversion of the pixel signal performed by the converter by comparing a pre-determined slope voltage with the pixel signal; and the controller selects the first or second mode according to a resolution from when the converter performed the conversion.

14. A control method for execution in an image capturing apparatus provided with an image capturing element, the control method comprising:

a converter converting a pixel signal into a digital signal by comparing the pixel signal, which is output from a plurality of pixels of the image capturing element, with a slope voltage for which the electric potential changes with time; and a controller controlling the converter using a plurality of modes corresponding to operation conditions for when the pixel signal is read out; wherein during the control, in a first mode, the controller performs control of the conversion of the pixel signal performed by the converter by comparing a slope voltage that has been selected from a plurality of slope voltages with the pixel signal;

in a second mode, the controller performs control of the conversion of the pixel signal performed by the converter by comparing a pre-determined slope voltage with the pixel signal; and the controller selects the first or second mode according to a vertical read out line number of the image capturing element.

* * * * *